US012033355B2

(12) United States Patent
Gunkel et al.

(10) Patent No.: US 12,033,355 B2
(45) Date of Patent: Jul. 9, 2024

(54) CLIENT/SERVER DISTRIBUTED CAMERA CALIBRATION

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Simon Norbert Bernard Gunkel, Duivendrecht (NL); Frank Ter Haar, Woerden (NL); Hans Maarten Stokking, Wateringen (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 346 days.

(21) Appl. No.: 17/414,804

(22) PCT Filed: Dec. 17, 2019

(86) PCT No.: PCT/EP2019/085531
§ 371 (c)(1),
(2) Date: Jun. 16, 2021

(87) PCT Pub. No.: WO2020/127185
PCT Pub. Date: Jun. 25, 2020

(65) Prior Publication Data
US 2022/0067974 A1 Mar. 3, 2022

(30) Foreign Application Priority Data
Dec. 21, 2018 (EP) .................................... 18215277

(51) Int. Cl.
*G06T 7/80* (2017.01)
*G06F 3/01* (2006.01)
(Continued)

(52) U.S. Cl.
CPC ................. *G06T 7/80* (2017.01); *G06F 3/012* (2013.01); *G06T 7/20* (2013.01); *G06T 7/50* (2017.01);
(Continued)

(58) Field of Classification Search
None
See application file for complete search history.

(56) References Cited

U.S. PATENT DOCUMENTS 9,940,535 B1 4/2018 Obotnine
10,534,942 B1 * 1/2020 Cornell .............. G06K 7/10752
(Continued)

OTHER PUBLICATIONS

Remondino et al; "Digital camera calibration methods: Considerations and comparisons;" ISPRS Commission V Symposium 'Image Engineering and Vision Metrology;' International Archives of the Photogrammetry, Remote Sensing and Spatial Information Sciences XXXVI(5), pp. 266-272 (Year: 2006).*
(Continued)

*Primary Examiner* — Edward Martello
(74) *Attorney, Agent, or Firm* — Hamilton, Brook, Smith & Reynolds, P.C.

(57) ABSTRACT

A processor system (200) processes image data from a camera (20) to render a virtual object in a 3D virtual environment and communicate via a network to a server system (300). A processor (220) obtains image data of the physical space from the camera and second data of a second device (30). The processor system sends the image data, the second data and a calibration command to the server system. In the server, a processing resource (320) processes the data
(Continued)

according to the calibration command and sends calibration data indicative of a camera pose and a second pose of the second device. The processor generates 3D object data of the object by processing the image data based on the calibration data. The 3D object data is provided for rendering the virtual object in the 3D virtual environment. So, the processor is in control, while the calibration is executed by the server.

16 Claims, 10 Drawing Sheets

(51) Int. Cl.
    *G06T 7/20*         (2017.01)
    *G06T 7/50*         (2017.01)
    *G06T 15/20*       (2011.01)
    *H04N 17/00*       (2006.01)
    *H04N 23/661*      (2023.01)
    *H04N 23/90*       (2023.01)

(52) U.S. Cl.
    CPC ........... *G06T 15/20* (2013.01); *H04N 17/002* (2013.01); *H04N 23/661* (2023.01); *H04N 23/90* (2023.01); *G06T 2207/10028* (2013.01); *G06T 2207/30244* (2013.01)

(56) References Cited

U.S. PATENT DOCUMENTS

| | | | |
|---|---|---|---|
| 10,839,557 B1* | 11/2020 | Arora | G06T 19/006 |
| 11,037,321 B2 | 6/2021 | Stokking et al. | |
| 2012/0162387 A1 | 6/2012 | Sakurai et al. | |
| 2013/0095924 A1* | 4/2013 | Geisner | A63F 13/21 |
| | | | 463/32 |
| 2013/0194164 A1* | 8/2013 | Sugden | G06T 7/12 |
| | | | 345/8 |
| 2016/0267717 A1* | 9/2016 | Bar-Zeev | G02B 27/017 |

OTHER PUBLICATIONS

Kevin Cohen; "Digital Still Camera Forensics;" Small Scale Digital Device Forensics Journal, vol. 1, No. 1, Jun. 2007 (Year: 2007).*
Notification of Transmittal of the International Search Report and The Written Opinion of the International Searching Authority, or the Declaration, "Cloud-Based Camera Calibration" issued for International Application No. PCT/EP2019/085531, mailed on Mar. 3, 2020.
Extended European Search Report issued for EP Application No. 18215277.7, entitled "Cloud-Based Camera Calibration," dated Jun. 19, 2019.
Alexiadis, et al., "Real-Time, Full 3-D Reconstruction of Moving Foreground Objects from Multiple Consumer Depth Cameras," *IEEE Transactions on Multimedia*, vol. 15, No. 1, Feb. 2013, pp. 339-358.
Doubek, et al., "Monkeys—a Software Architecture for ViRoom—Low-Cost Mutlicamera System," *Computer Vision Laboratory*, ETH Zurich, Switzerland, Mar. 14, 2003.
Gunkel, et al., "Virtual reality conferencing : Multi-User Immersive VR Experiences on the web." *Proceedings of the 9th ACM Multimedia Systems Conference* on Jun. 12-15, 2018, pp. 498-501.
Mielczarek, et al., "FPGA-Based Image Analyzer for Calibration of Stereo Vision Rigs," no date.
Park, et al., "Use Cases and Requirements for NBMP (v4)," ISO/IEC JTC1/SC29/WG11 MPEG2018/N17502, Apr. 2018, San Diego, 31 pages.
Remondino, et al., "Digital Camera Calibration Methods: Considerations and Comparisons," IAPRS vol. XXXVI, Part 5, Dresden Sep. 25-27, 2006, pp. 266-272.
Remondino, et al., "State of the Art in High Density Image Matching," *The Photogrammetric Record*; 29(146): 144-166 (Jun. 2014).
Wikipedia, "3D Reconstruction from Multiple Images," Dec. 6, 2018, pp. 1-8; https://en.wikipedia.org/w/index.php?title=3D_reconstruction_fr.

* cited by examiner

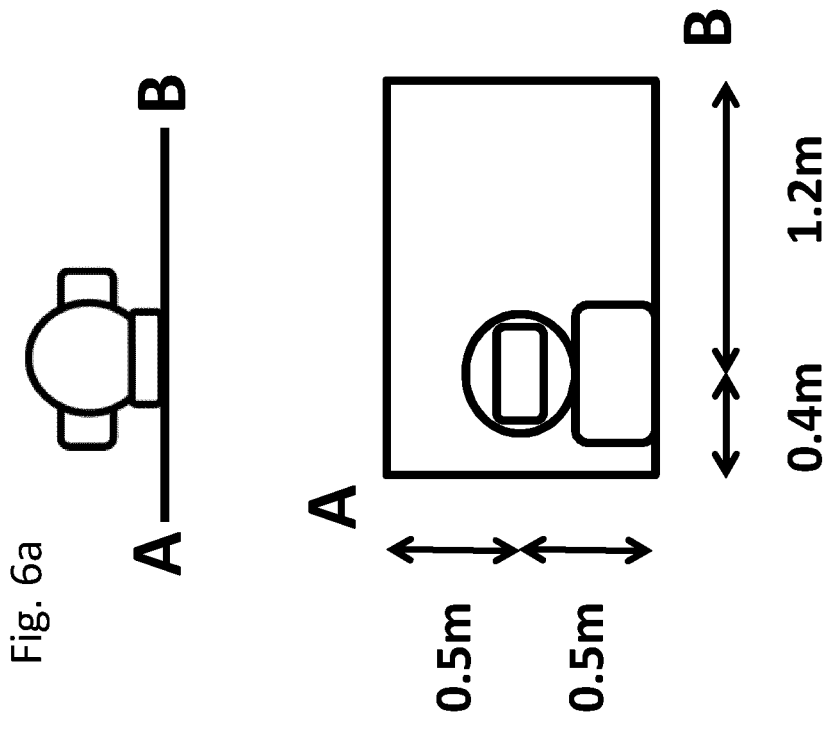

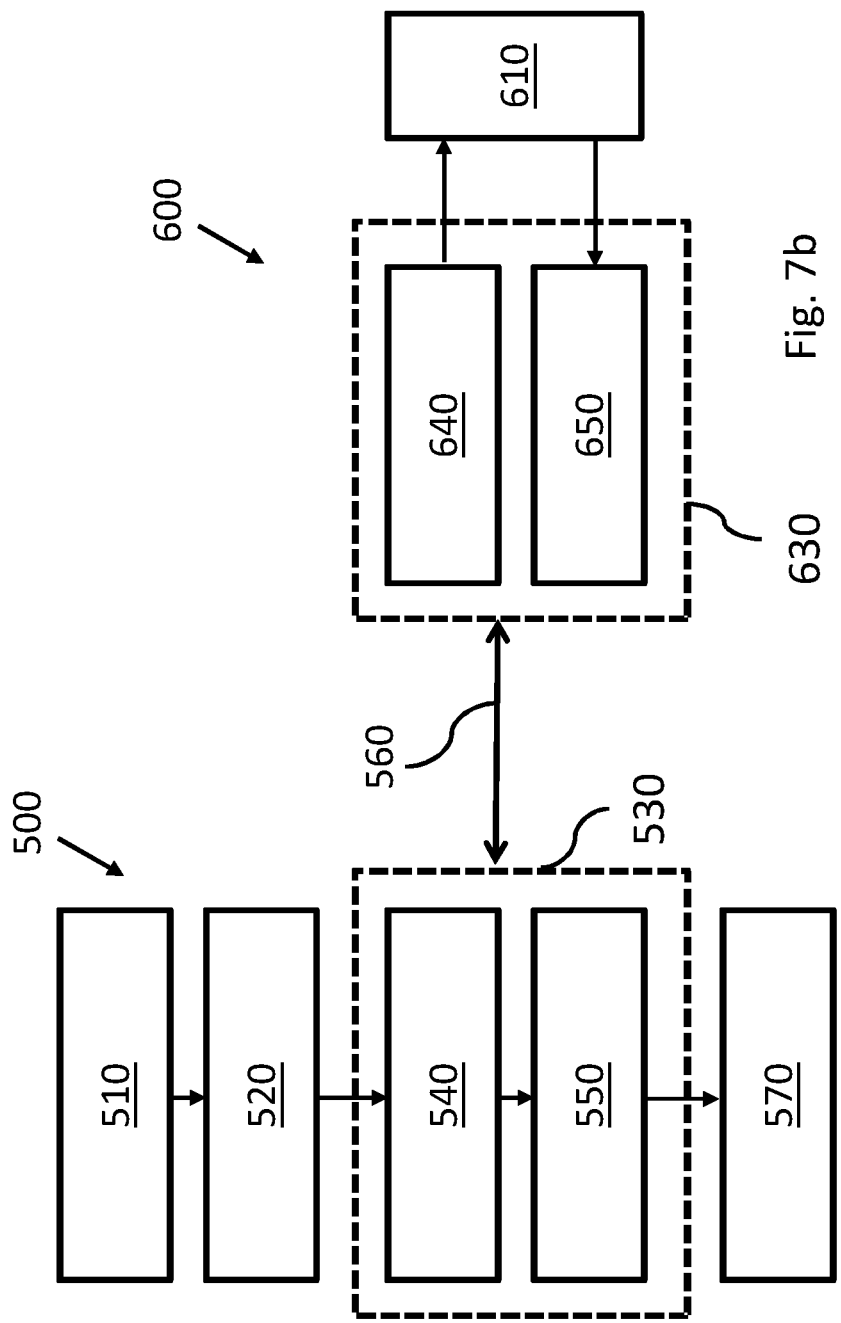

CLIENT/SERVER DISTRIBUTED CAMERA CALIBRATION

This application is the U.S. National Stage of International Application No. PCT/EP2019/085531, filed Dec. 17, 2019, which designates the U.S., published in English, and claims priority under 35 U.S.C. § 119 or 365(c) to EP Application No. 18215277.7, filed Dec. 21, 2018. The entire teachings of the above applications are incorporated herein by reference.

FIELD OF THE INVENTION

The invention relates to a processor system for processing image data from a camera in a physical space to render a virtual object in a 3D virtual environment, the virtual object representing an object in the physical space, the processor system arranged to communicate via a network to a server system comprising a processing resource. The invention further relates to a server system, processing methods and computer programs comprising instructions for causing a processor system to perform the methods.

The invention relates to the field of providing a virtual reality (VR) environment, in which one or more users or other objects that are present in a physical space like a room may be rendered as virtual objects. Such an environment may be called a social VR environment, where the objects are captured by one of more cameras. For various kinds of image processing, mainly for creating a 3D model of a user to be used for a so-called self-view being a virtual 3D image of the user himself in a 3D virtual environment, calibration of cameras regarding their pose, i.e. camera position and orientation in the physical space or relative to a further object, camera or device, is required. Various cameras or devices in the physical space may have their own location and/or axial references for position and orientation, which references may be mapped on the physical space and/or relative to each other in the process of calibration.

BACKGROUND ART

Calibrating camera(s) for capturing objects such as people in a social VR setting can be quite complex, particularly in an automated process which needs to deal with multiple cameras. Some of the challenges are:

Using a single image and depth camera: to detect a person, e.g. a head or a VR headset, in order to correctly place a virtual self-view of the person in the VR environment and correctly position the virtual user in the VR environment. Also, boundaries of the room, e.g. a floor or a chair, need to be detected in order to place the user correctly in a VR environment of a remote user. For example, when recording a person on a chair, it is required to properly place the captured chair on the floor in the virtual environment;

Using multiple image and/or depth cameras: Different cameras need to be aligned in order to be used together for capture, e.g. a user is captured from different angles to create a better 3D capture of the user. Such alignment can be done by point matching of at least 3 points using depth-based calibration;

Using multiple image only (non-depth) cameras: creating depth images from multiple regular RGB cameras requires a complex stereo image point matching on each frame;

For all camera images to be displayed accurately in the geometrical VR space, camera characteristics including focal length and lens distortion of the cameras are needed, which, for example, may be detected with the help of a visual pattern.

As such, camera calibrations are known in the art. However, a problem is that such calibrations require quite some processing, possibly even requiring specialized hardware, for example a Graphical Processing Unit GPU (see reference [1] section IV.B.2), or a FPGAs (see reference [2]).

From a processing perspective, it makes sense to perform processing remotely, e.g. in the "cloud", possibly somewhere where specific hardware is available. Examples of such processing on a system different from the capture system, e.g. in multi-camera sensor systems, are provided in reference [3] and [4].

SUMMARY OF THE INVENTION

Prior art methods may enable transferring the image processing task to a remote processing resource. However, this does not solve the situation in which processing results are required locally and speedily. Such situations may however be hampered by limited local processing capability, limited capacity of network connections, delays caused by image data transmission or, when using wireless systems, may cause additional drain of the battery. For example, a local image processing system (i.e. PC) may include one or more (depth) cameras, and may need to use the captured images locally. Further examples of local processing using a local camera include a smartphone, a smartphone with 1 or more external cameras, or possibly 2 smartphones directly connected, with one of them as the main capture system. External cameras or smartphones may for example be connected by Bluetooth connections.

A need for using local processing may arise due to end-to-end delays. For example, see [4] section 4.1.6, all video is sent to the network, is processed there and then sent onwards. Such transmission may cause additional delays, e.g. due to additional encoding/decoding steps in the end-to-end video transmission chain. If the local system constructs a required output, e.g. a 3D point cloud or mesh, this will avoid or reduce end-to-end delays.

An exemplary purpose for using the images locally is to create a self-view, which is a 3D representation of the user's own body, which self-view is usually made visual through a VR headset (also called HMD, Head Mounted Display). In this document, the user, e.g. the user's body or head, or any other element in a room or location captured by a camera may be named: an object in the physical space. Data that is corresponding to such object which may be visually represented as a virtual object in the VR environment may be called 3D object data. Said self-view is an example of the virtual object that corresponds to the actual user in a room where the camera is placed. The self-view in the virtual environment should preferably be well aligned with the user's body, to ensure that the proprioceptive experience matches the visual experience of the user. Also, the self-view may include a view of further local physical objects such as a chair, a coffee cup, etc. Another purpose of 3D object data is for local use in Augmented Reality, i.e. to create a local 3D model of the room and render the virtual object in that virtual room, e.g. in a VR/AR hybrid scenario where some users wear an AR headset and see other users projected in their own physical environment. In this document, such AR environment including virtual objects may also be called a 3D virtual environment.

Hence there may be a need for a system that locally provides 3D object data for rendering a virtual object in a 3D virtual environment, while reducing the need for local processing power.

In accordance with a first aspect of the invention, a processor system may be provided for processing image data from a camera in a physical space to render a virtual object in a 3D virtual environment, the virtual object representing an object in the physical space.

The processor system arranged to communicate via a network to a server system comprising a processing resource, wherein the processor system may comprise
  a network interface for exchanging data via the network;
  a capture interface to the camera;
  a second device interface to a second device in the physical space;
the camera having a camera pose in the physical space and the second device having a second pose in the physical space, the second pose being different from the camera pose; and
  a processor that may be configured to:
    obtain image data of the physical space from the camera via the capture interface;
    obtain second data of the second device via the second device interface;
    send the image data, the second data and a calibration command to the server system;
    receive calibration data according to the calibration command from the server system, the calibration data being indicative of the camera pose and the second pose;
    generate 3D object data of the object by processing the image data based on the calibration data, the 3D object data being provided for rendering the virtual object in the 3D virtual environment.

In accordance with a further aspect of the invention, a server system may be provided for processing image data from a camera in a physical space for rendering a virtual object in a 3D virtual environment, the virtual object representing an object in the physical space.

The server system arranged to communicate via a network to a processor system, wherein the server system comprises
  a network interface for exchanging data via the network and
  a processing resource that may be configured to:
    receive image data of the physical space obtained by the camera, second data of a second device in the physical space, and a calibration command from the processor system via the network interface;
    process the image data and the second data according to the calibration command to generate calibration data indicative of the camera pose and the second pose; and
    send the calibration data to the processor system via the network interface.

In accordance with a further aspect of the invention, a processing method for a processor system is provided for processing image data from a camera in a physical space to render a virtual object in a 3D virtual environment, the virtual object representing an object in the physical space.

The processor system may be arranged to communicate via a network to a server system, the camera having a camera pose in the physical space and a second device having a second pose in the physical space, the second pose being different from the camera pose.

The method may comprise:
  obtaining image data of the physical space from the camera;
  obtaining second data of the second device;
  sending the image data, the second data and a calibration command to the server system;
  receiving calibration data according to the calibration command from the server system, the calibration data being indicative of the camera pose and the second pose; and
  generating 3D object data of the object by processing the image data based on the calibration data, the 3D object data being provided for rendering the virtual object in the 3D virtual environment.

In accordance with a further aspect of the invention, a processing method for a server system is provided for processing image data from a camera in a physical space for rendering a virtual object in a 3D virtual environment, the virtual object representing an object in the physical space.

The server system may be arranged to communicate via a network to a processor system, wherein the method comprises:
  receiving image data of the physical space obtained by the camera, second data of a second device in the physical space and a calibration command from the processor system;
  processing the image data and the second data according to the calibration command to generate calibration data indicative of the camera pose and the second pose; and
  sending the calibration data to the processor system.

Furthermore, there is provided a transitory or non-transitory computer-readable medium comprising a computer program, the computer program comprising instructions for causing a processor to perform the one or both of the above methods. Also, there is provided signal data to be transferred between the above processor system and the above server system, the signal data being structured to carry the calibration command or the calibration data.

The measures in the various systems and methods as mentioned above may have the following effect. The processing may be structured as follows. First, the local processor system, also called client, sends image data and a calibration instruction to the server. In this disclosure, the term 'server' may be used, which may include any server system or systems in the network having processing resources capable of carrying out the calibration, including systems that include specialised hardware for image processing. This may include, but is not limited to, cloud computing, edge computing, fog computing and mist computing, and may also include another local computer with sufficient processing capabilities.

On the server, the image data is analyzed according to the calibration instruction to determine calibration data. Then the server sends calibration data to the client. Finally, the client uses the calibration data for processing image data to generate the 3D object data. It is noted, that the image data processed on the client may be different data (e.g. future captured frames) than the image data sent to the server. So, the processor system locally controls the capture and processes the image data from the camera to obtain the 3D object data, which enables real-time use of the 3D object data. The calibration, which is a complex operation often using complex algorithms to extract the required calibration data from the visual images, is performed remotely on the server under the control of the client according to the calibration commands. So, advantageously, executing on the server calibration and optionally related processing such as, for example, monitoring, is offloading a lot of work from the local system.

In practice, the local client delegates the calibration to a server system in the network. Depending on the delay-requirements, this may be to a system in the edge of the network (e.g. 5G edge computing) or to any system in the network (e.g. typically 'in the cloud').

Advantageously, the total processing load is subdivided into a remote part that is relatively complex and local part that is time critical. The local part is generating the 3D object data of the object by processing the image data based on the calibration data. In the remote part at the server system, the calibration data is generated by instructing the server system. Thereto, the calibration command and the respective image data and second data are sent to the server system. Subsequently, the server system performs the complex task of calibration, and sends the calibration data back to the local processing system. Advantageously, the processing of the video data to derive the 3D object data is locally performed while using the remotely generated calibration data.

Moreover, there may be some delay in obtaining the calibration data, e.g. at a re-calibration upon changes in the camera configuration. This may temporarily result in some misalignment, until the updated calibration data has been generated and transferred to the client. However, advantageously, the real-time behavior of the 3D object data still closely follows the actual physical object, as the local processor is not slowed down by performing the calibration.

The second device may be a head mounted display (HMD) or a user interaction device or any other reference device for sensing a movement of a user in the physical space. The HMD may render the virtual 3D environment. In an embodiment of the processor system, the processor is configured to obtain, as the second data, data regarding the position or orientation of the second device in the physical space. The data may comprise at least one of
 a displacement distance of the second device;
 a displacement direction of the second device;
 a rotation angle of the second device;
 a rotation direction of the second device. The displacement distance or direction may be defined with reference to a reference point or plane. The rotation angle or direction may be defined with reference to a rotation axis. Advantageously, said specific spatial second data regarding the position, orientation or movements of the second device may be processed and matched to the image data of the camera, so as to enhance the calibration data regarding the pose of the camera and the pose of the second device.

In a practical case, the second device may be a HMD for rendering the virtual 3D environment and the object may be a person wearing the HMD in the physical space. The processor may be configured to generate, as the 3D object data, position and/or orientation data of the person by processing the image data to determine the pose of the head mounted display, the 3D object data being provided for rendering a self-view as the virtual object in the 3D virtual environment. The HMD may report, as the second data, on its own axis and orientation, i.e. it has its own (0,0,0) point and orientation angle (usually, horizontally level+north direction), i.e. data from the HMD about its relative position and orientation in physical space. Meanwhile, the image data of the camera also is about the physical space. Calibration is linking the two data types together by determining the pose of the camera and the HMD relative to each other.

Advantageously, the person will experience himself in the 3D virtual environment at a realistic position and orientation, because the self-view is positioned and oriented according to the position of the HMD, i.e. the head of the person, while the image data is processed to determine the pose of the HMD.

The second device may comprise a second camera and/or a depth camera. In an embodiment of the processor system, the processor is configured to obtain, as the second data, at least one of second image data of the physical space and depth data of the physical space. Advantageously, said further image and/or depth second data may be processed and matched to the image data of the camera, so as to enhance the calibration data regarding the pose of the camera and the second device.

In an embodiment of the processor system, the processor may be configured to obtain metadata indicative of at least one parameter of the camera or the second device; and include the metadata in the calibration command. Optionally the metadata comprises a static device parameter comprising at least one of device type, a lens parameter, lens distortion data, image sensor resolution, depth sensor resolution, device data transfer format. Optionally, the metadata may comprise a dynamic device parameter comprising at least one of a focal length parameter, a tilt parameter, a pan parameter, a camera focus parameter, a camera diaphragm parameter, synchronization data. Advantageously, the metadata may be applied during calibration to map the image data to the physical space. Static parameters may be applied for all calibration types, for example during an initial calibration or a reference calibration. Dynamic parameters may be used for updating the calibration upon a change in the parameters.

In practice, processing for calibration may pose a problem when starting a capture. When the capture device or devices are set up for a session, most of the calibration needs to be done once at the start of the session.

In an embodiment of the processor system, the processor may be configured to determine a need for reference calibration data, the reference calibration data comprising at least one of
 a reference view of the physical space without the object;
 fixed elements in the physical space;
 visual markers in the physical space;
 a predefined object in the physical space;
 and the processor is configured to include in the calibration command a request regarding said need for reference calibration data. Advantageously, the reference calibration data may be used for processing image data, for example to track the elements, markers or objects, or to isolate such elements from the physical space in the image data.

In an embodiment of the processor system, the processor may be configured to determine, after receiving the calibration data of an earlier calibration, a need for re-calibration. The need may comprise one of
 detecting a movement of the camera with respect to the camera pose according to the earlier calibration;
 detecting a movement of the second device;
 addition of a further device in the physical space, the further device being able to provide further image data, depth data or data regarding the position or orientation of the further device in the physical space. Optionally, the processor may be configured to include, in the calibration command, a request regarding said need for re-calibration. Advantageously, by being aware of the specific need, the server may efficiently process the image data and/or second data and/or further data, while taking into account the earlier calibration data.

In practice, things may change during a session. Cameras may be moved during the session, e.g. the user may move them upon discovering that their placement is not optimal. Movement is also a factor with handheld cameras, e.g. using a smartphone as a capture system. Cameras may zoom in or out or pan (for PTZ (Pan-Tilt-Zoom) cameras) during a session. Cameras may be added during a session, e.g. a user connecting an additional camera to improve 3D reconstruction. An HMD may have a drift in its tracking, thereby requiring re-calibration overtime when the drift becomes too large.

In an embodiment of the processor system, the processor may be configured to, after receiving the calibration data of an earlier calibration, receive re-calibration data from the server system, and use the re-calibration data for processing the image data to obtain the image data of the object. Advantageously, upon receiving the re-calibration data, the processor may immediately replace earlier calibration data. Also, the processor may efficiently process the image data and/or second data, while taking into account earlier calibration data and the re-calibration data.

In an embodiment of the server system, the processing resource may be configured to determine, after an earlier calibration, a need for re-calibration. The need may be one of
  receiving a re-calibration command indicating the need for re-calibration;
  detecting a movement of the camera with respect to the camera pose according to the earlier calibration;
  detecting a movement of the second device with respect to the second pose according to the earlier calibration;
  addition of a further device in the physical space, the further device being able to provide further data regarding the physical space. The processing resource may be configured to process the image data and the second data to generate re-calibration data indicative of the camera pose and the second pose; and send the re-calibration data to the processor system. In particular, detecting a movement may comprise determining that the change in poses has exceeded a threshold in change of position, change of orientation, velocity or acceleration. Advantageously, by being aware of the specific need, the server system may efficiently process the image data and/or second data and/or further data, while taking into account the earlier calibration data.

In an embodiment of the server system, the processing resource may be configured, upon receiving a monitoring command, to
  monitor a data stream regarding the physical space from the camera or the second device;
  determine a need for re-calibration based on the data stream and the calibration data;
  engage a re-calibration to generate re-calibration data for sending the re-calibration data to the processor system. For example, the data stream may be generated and transferred by the processor system for said monitoring, e.g. image data at a low rate stream such as once per second, or it may be a data stream that is transferred from the processor system to a further destination, which is routed via the server system. Advantageously, the monitoring and recalibration may be performed by the server while taking substantially no processing power at the client side.

In practice, detecting the need for calibration may be a first step of a calibration process. When an additional camera is added, this is a clear sign for calibration. But, when a camera is moved, e.g. only slightly, this is not so evident, i.e. it may lead to only small errors in the captured result. So, monitoring the need for calibration can be seen as part of the calibration. Both detecting the need for and the actual calibration itself would be a heavy processing load on the local system, which may not be able to do this in real-time, possibly causing system overloads, or impacting the overall performance, and it may drain the battery or may even lead to (over)heating of the local system.

In an embodiment of the server system, the image data may comprise a first image at a first instant and a second image at a second instant, and the second data may be indicative of an actual movement of the second device from the second pose at the first instant to a subsequent second pose at the second instant. In the embodiment the processing resource may be configured to detect the actual movement of the second device as represented in the image data, derive at least one camera parameter from the actual movement as represented, and use the camera parameter as derived for generating the calibration data. Advantageously, camera parameters may be derived at the server side, while taking substantially no processing power at the client side.

In an embodiment of the server system, the processing resource may be configured to determine reference calibration data, the reference calibration data comprising at least one of
  a reference view of the physical space without the object;
  fixed elements in the physical space;
  visual markers in the physical space;
  a predefined object in the physical space,
  and to send the reference calibration data to the processor system. Advantageously, the reference calibration data may be generated on request or automatically at the server side. The processor system may receive the reference calibration data, while taking substantially no processing power at the client side.

It will be appreciated by those skilled in the art that two or more of the above-mentioned embodiments, implementations, and/or aspects of the invention may be combined in any way deemed useful.

Modifications and variations of the processor system, the devices, the server system, and/or the computer program, which correspond to the described modifications and variations of the method, and vice versa, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings, FIG. 6a shows a user self-view to be positioned and a plane A-B, FIG. 6*b* shows the front view of the self-image, FIG. 6*c* shows determining the corner coordinates for A and B, FIG. 7*a* shows a method for a processor system, FIG. 7*b* shows a server method for a server system.

Figure 1:
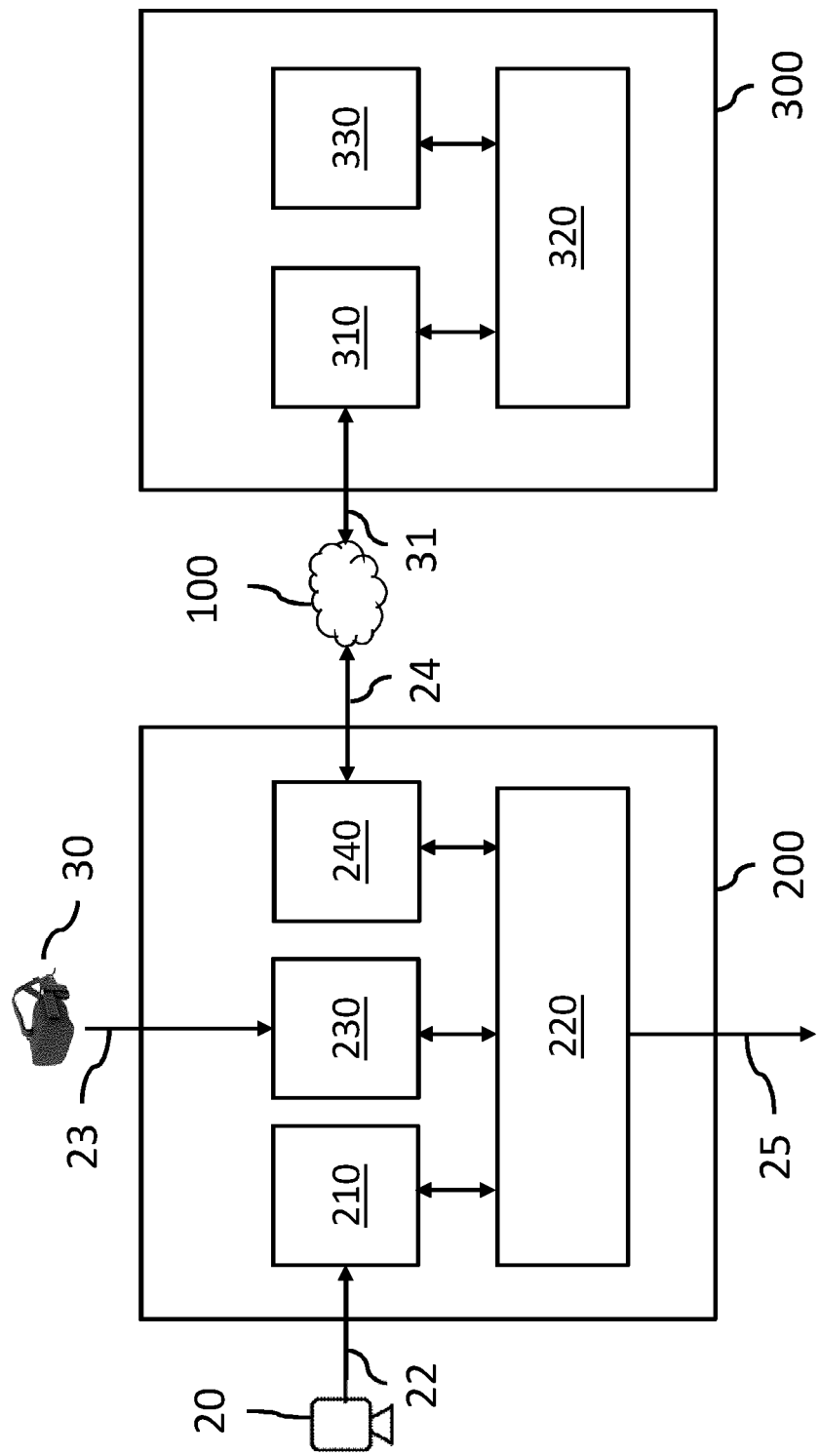
FIG. 1 shows an example of a system for rendering a virtual object in a 3D virtual environment.

It should be noted that similar items in different figures may have the same reference numbers, may have similar structural features, functions, or signals. Where the function and/or structure of such an item has been explained, there is no necessity for repeated explanation thereof in the detailed description.

DETAILED DESCRIPTION OF EMBODIMENTS

The following describes several embodiments of the processor system and server system embodying the generation of 3D object data. First, some further general description of the technical concept of calibration is provided. In this context, calibration is about making the image data usable in a 3D virtual environment. Examples of image data which need calibration and enable to retrieve 3D objects from it, are:

- A single RGB image+Depth frame, calibrated with respect to the physical space of the image. A HMD as second device may be present in the room. It may be sufficient to detect the HMD position in the image, and thus allow for properly placing the self-view in the 3D virtual environment.
- Multiple RGB+Depth images for a single moment in time, i.e. from different cameras. Such data allows aligning the cameras using at least 3 points, i.e. using depth-based multi-camera calibration.
- Multiple RGB images for a single moment in time, using vision-based approaches to align the camera images.

For detecting a need for (re-)calibration, new frames are needed over time to detect changes in images, e.g. for detecting camera movement. In practice, the client may also send a stream containing the images via the network, e.g. to other clients, and such stream may be used for detecting calibration needs also. Alternatively, e.g. in case of local use such as for self-view, the client may send regular image data updates to the server for this purpose.

Multi-camera calibration may require time synchronization between camera images, for example when multiple mobile phones are used as cameras. In a distributed camera network, this issue can be solved using synchronization techniques known as such, e.g. using clock synchronization between the systems and time stamps for the images. When multiple cameras are connected to a single local system, time synchronization can be arranged for at the local level. For example, a local capture system can capture images (RGB and/or depth) from multiple cameras simultaneously.

In this document the concept of network comprises various types of networks, both local, regional and global networks. A network may include one or more network parts like a home network, a company network, a network domain under control of a specific service provider, e.g. an internet service provider (ISP), and may include both fixed (i.e. wired) and wireless (e.g. Wi-Fi or cellular) connections. Such a network may comprise a multitude of network resources including servers, nodes and links connecting the nodes, and optionally network controllers having a network controller interface for exchanging network control data. The network may be configurable for transferring data via a chain of network resources between a first end node and a second end node, while routing a data stream via a particular server. Each end node may have a network interface and further control logic for exchanging data via the network, well-known as such. The server system may be coupled to the network near the user's location to provide so called edge computing that further limits transmission delays, or at a remote location or node in the network.

FIG. 1 shows an example of a system for rendering a virtual object in a 3D virtual environment. The system comprises a processor system 200, which may be called a client, and a server system 300, which may be called a server. The processor system 200 is arranged for processing image data 22 from a camera 20 in a physical space to render a virtual object in a 3D virtual environment. The virtual object represents an object in the physical space. The processor system is arranged to communicate via a network 100 to the server system 300. The processor system has a network interface 240 for exchanging data 24 via the network 100, a capture interface 210 to the camera 20 and a second device interface 230 to a second device 30 in the physical space, e.g. a head mounted display (HMD). The camera has a camera pose in the physical space and the second device has a second pose in the physical space. The second pose is different from the camera pose, and may be any pose defining a position and orientation of a device in the physical space, absolute or relative to a further object, camera or device.

The processor system has a processor 220 which processor is configured to obtain the image data 22 of the physical space via the camera 20, and to obtain second data 23 via the second device 230. The processor is also arranged to send the image data, the second data and a calibration command to the server system 300 via the network 100. The processor is also arranged to receive calibration data according to the calibration command from the server system 300. The calibration data is indicative of the camera pose and the second pose. The processor is also arranged to generate 3D object data 25 of the object by processing the image data based on the calibration data. The 3D object data is provided for rendering the virtual object in the 3D virtual environment. For example, the 3D object data may be to render the virtual object in a virtual environment in the HMD 30, which rendering may be also performed by the processor 220. Alternatively, the 3D object data 25 may be transferred to a further device, e.g. a client at a different location, e.g. via the network 100. At the different location a 3D virtual environment may be rendered including the 3D virtual object.

FIG. 1 also shows the server system 300. The server system is arranged for processing image data from a camera in a physical space for rendering a virtual object in a 3D virtual environment. The server system is arranged to communicate via the network 100 to the processor system 200 as described above. The server system has a network interface 310 for exchanging data 31 via the network and a processing resource 320. The processing resource is configured to receive the image data, the second data and the calibration command from the processor system 200. The processing resource is also configured to process the image data and the second data according to the calibration command to generate calibration data indicative of the camera pose and the second pose and send the calibration data to the processor system. The processing resource may have an image processor 330 which contains dedicated hardware for processing image data at high speed.

Advantages of the above system include offloading client processing to the server, thereby alleviating the burden from the client. The server may have specific hardware 330 to accelerate the processing, e.g. GPU or FPGA hardware, thereby doing the processing more efficiently than the client could do. Also, the setup may save time, given that the server may do calibration quicker than the client, and the network delays are small, i.e. a particular advantage when using 5G edge computing. Also, the setup may save battery power on mobile/battery powered clients.

In an embodiment, the second device is a head mounted display (HMD). The HMD may be used to render a 3D virtual environment. Alternatively, the second device may be a user interaction device for sensing a movement of a user in the physical space, e.g. a game movement sensor to be manipulated by the user. The processor 230 is further configured to obtain, as the second data, data regarding the position or orientation of the second device in the physical space. In the embodiment, the second data may be a displacement distance of the second device or a displacement direction of the second device. Also, the second data may be a rotation angle of the second device or a rotation axis of the second device. Also, the second data may be a combination of these. Note that this second data is data reported by or about the second device, and is thus self-contained: it may not be data about the absolute position and orientation in physical space, but may be about position and orientation relative to an (internally decided) axis system of the second device. E.g. when turning on an HMD for the first time, it may then determine its first position to be its (0,0,0) point and its first orientation to be its "north orientation" or "O-orientation". Note that an HMD often has internal inertial sensors capable of determining if an HMD is horizontally level.

Figure 2:
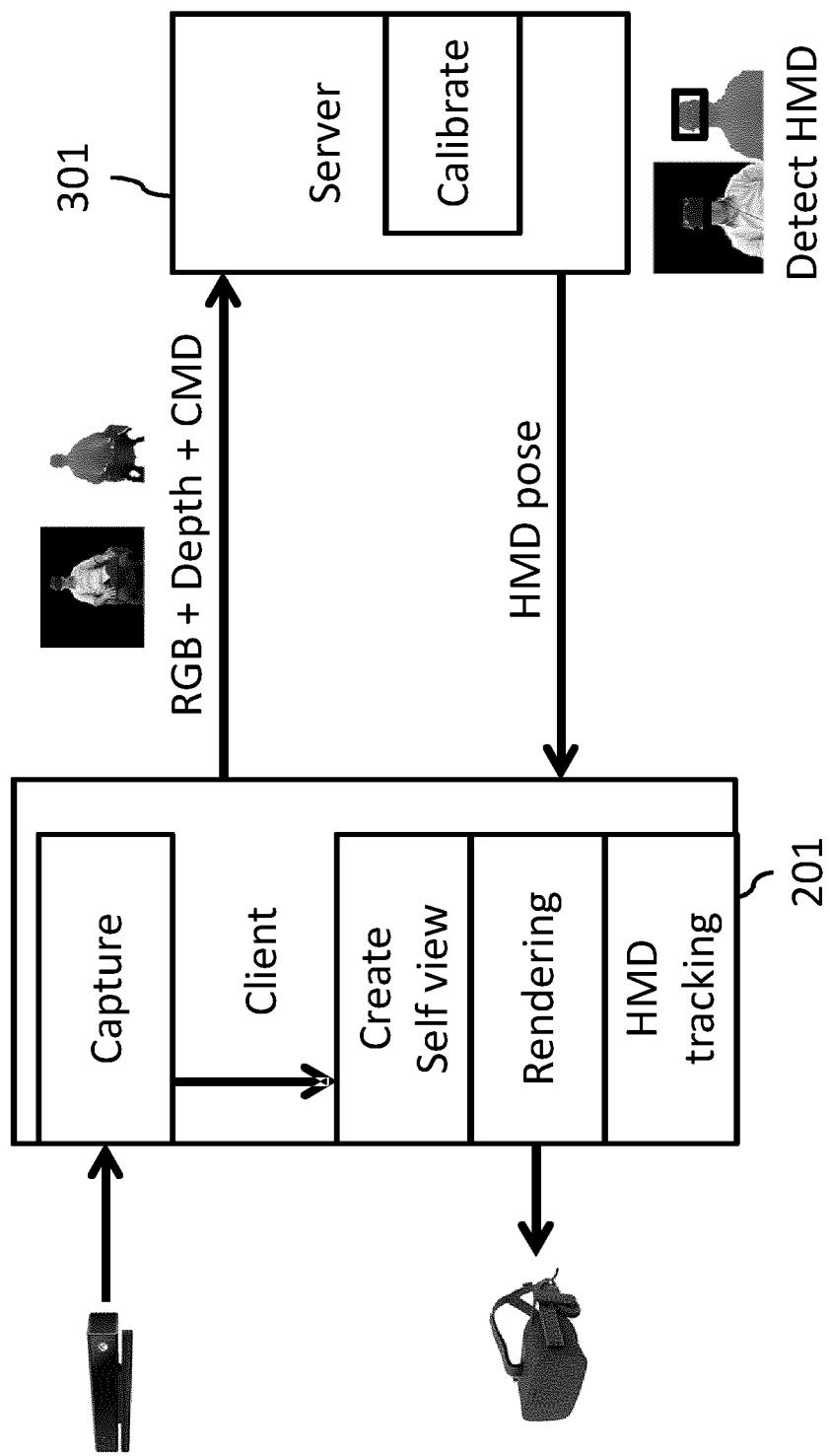
FIG. 2 shows an example of a system for rendering a self-view in a 3D virtual environment.

FIG. 2 shows an example of a system for rendering a self-view in a 3D virtual environment. Structure of the client system 201 and the server system 301 may correspond to the corresponding systems and elements in FIG. 1 described above, while the Figure schematically shows the data to be transferred and functions to be performed. In the example, a user wears an HMD connected to a client system (PC), to which also an RGB+depth camera (e.g. Microsoft Kinect or Intel RealSense D415) is connected. The example shows how the server can be used to calibrate the HMD position in relation to the camera, so that the created self-view can be positioned correctly in the virtual environment. Calibration may include matching depth information spatially to the RGB information.

The client system 201 has a capture interface coupled to one or more cameras. As the second device a head mounted display is shown. In the example, the object is a person wearing the head mounted display sitting in a chair in the physical space. The client transfers image data, e.g. RGB and depth data, and a calibration command (CMD) to the server 301.

The server 301 receives the calibration command, and the image data and HMD data such as position and orientation of the HMD. The server then performs the calibration according to the calibration command.

At the client 201, the processor is configured to generate, as the 3D object data, position and/or orientation data of the person. Thereto the client receives the calibration data from the server, e.g. the HMD pose as detected by the server and subsequently transferred to the client as shown. The processor in the client is now enabled, by using the calibration data, to process the image data as captured to determine the actual pose of the head mounted display, i.e. the 3D object data. Based thereon, a self-view is created using the 3D object data for rendering the self-view as the virtual object in the 3D virtual environment. Also, the client may track movements of the HMD for adapting the pose of the virtual object, i.e. the self-view, in the 3D virtual environment. The client may store position and/or orientation data of the HMD at the time of capturing the image, or a sequence of images, which HMD data may be used for calibration.

A captured image containing an RGB image and a depth image, and/or the HMD data, are sent to the server. The server may use a vision-based approach to detect the HMD in the image. This may be facilitated with additional markers on the HMD, e.g. QR-code like markers, to making detection easier.

The server may need to detect both the position and the orientation of the HMD in the image. The position may consist of placement in the image frame (X,Y-coordinates) and the depth value. The orientation may consist of a vector or of rotation values on the various axis. The axis system may be that pointing directly towards the camera is the north direction. The detected HMD pose (position and orientation) is sent back to the client, for correctly placing the self-view. To position a self-view correctly based on alignment of the reported HMD pose and the detected pose, the HMD size and shape may be required. For the sake of brevity, this is omitted here, and a single position/orientation is used.

Further, for a self-view the correct metric size of the captured image and the person or object in it may be required. The captured 2D RGB image together with the captured depth image, can be transformed into a 3D point cloud. In virtual reality, this point cloud can be positioned at the exact user location, based on the detected HMD position/orientation. To correctly size the virtual self-view, more information may be used, e.g. as elucidated in the application EP16201955.8. For example, this information can be obtained as follows:

by 'measuring' the object in the captured image, based on the camera characteristics (i.e. focal length, sensor size) and measured depth of the object in the image:

$$\text{object\_size} = \frac{\text{distance to obj} \times \text{obj\_height} \times \text{sensor\_height}}{\text{focal length} \times \text{image\_height}}$$

by knowing the exact size of an object in the image. E.g. if the client tells the server the brand and model of the HMD, and the exact size and shape of this HMD is known at the server, it can use this to determine the camera characteristics and thus measure other objects in the image as well;

by combining tracking information across various video frames, with the detected position and orientation. If the captured user moves 50 cm to the right, this is tracked by the HMD tracking on the client. Knowing this movement, it would allow the server to measure this between the captured images, and thus also determine the camera characteristics. This requires the client to report on this movement to the server, based on the HMD tracking data.

Figure 3:
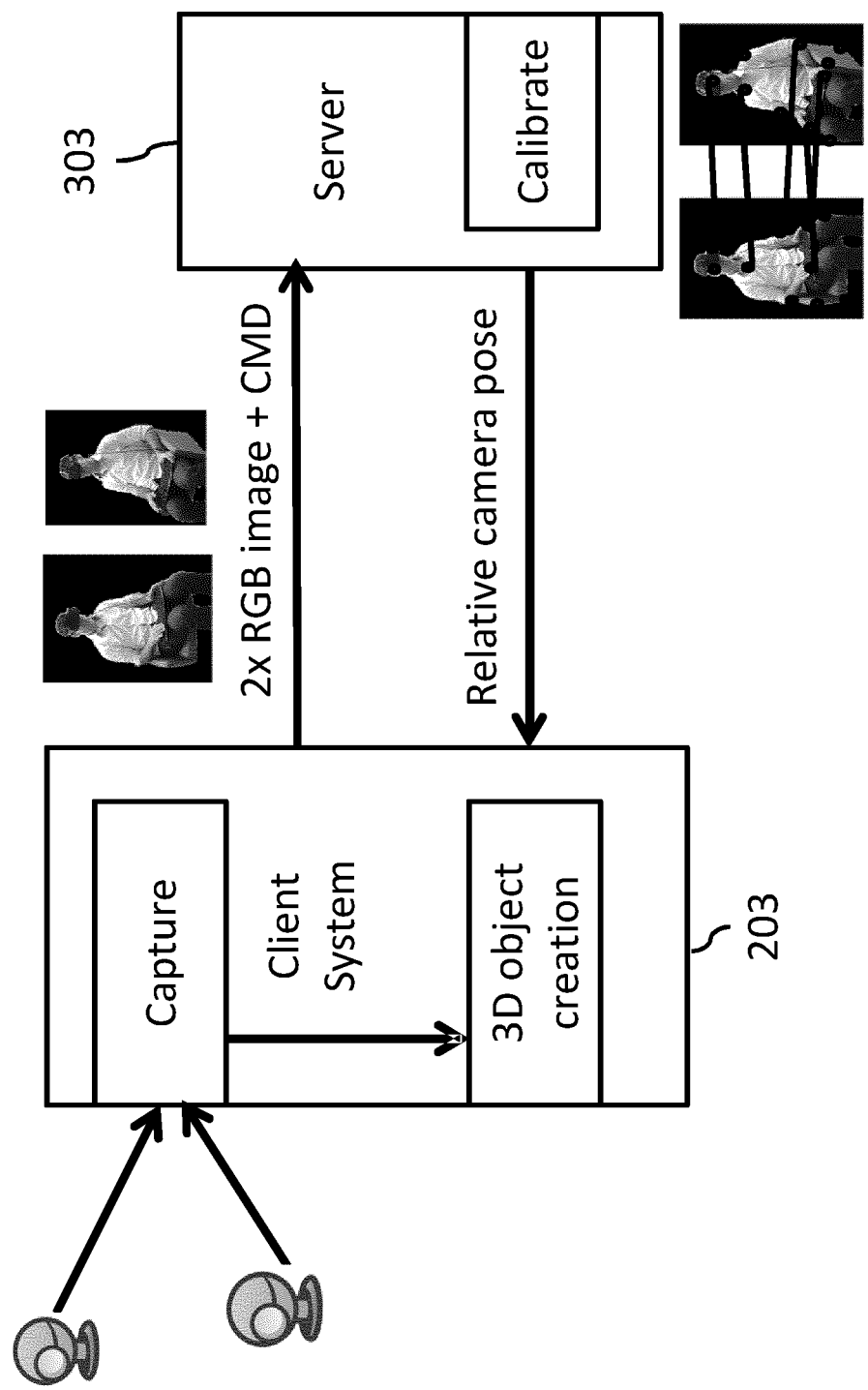
FIG. 3 shows an example of a system for 3D object creation.

The above calibration information may be used for correctly sizing the self-view, but may further be used for keeping the placement correct upon user movement. If the user moves 50 cm to the right, the self-view, created with the captured RGB+depth image, should remain correctly placed. Movement information may be derived locally, e.g. the client may obtain this information from the camera. Or, this information may be detected during calibration, and then has to be send to the client alongside the detected HMD position and orientation FIG. 3 shows an example of a system for 3D object creation. Structure of the client system 203 and the server system 303 may correspond to the corresponding systems and elements in FIG. 1 described above, while the Figure schematically shows the data to be transferred and functions to be performed. The Figure shows that a user is captured with two cameras. Then, upon calibration between the cameras at the server and returning the relative camera poses, a 3D user capture can be performed to generate the 3D object data of the user.

The client system 203 has a capture interface coupled to two RGB cameras, so the second camera constitutes the second device. In the example, the object is a person wearing the head mounted display sitting in a chair in the physical space. In this example, the HMD is not detected as such, i.e. it is just an object worn by the user. The client transfers image data, e.g. two RGB images, and a calibration command (CMD) to the server 303.

The server 303 receives the calibration command, and both images, e.g. via a network like the internet. The server then performs the calibration according to the calibration command by matching elements in both images as schematically shown. The server generates the calibration data, e.g. the relative camera pose of the second camera with respect to the first camera. Also, the server may generate a depth map as part of the calibration data, using the differences of both RGB images and the relative pose of both cameras.

In the embodiment, the second device is a second camera. Alternatively, or additionally, the second device may also be a depth camera, or a combined image and depth camera. The processor is configured to obtain, as the second data, second image data of the physical space, and/or depth data of the physical space. In the calibration command, the client may command the server to provide calibration data regarding the pose of the second camera relative to the first camera, and/or mapping a coordinate system and/or matching parameters or other properties of both cameras.

In the example as shown in FIG. 3, a user is recorded with 2 RGB cameras. This allows creating of a 3D version of the user, which can be streamed as a point cloud or a time varying mesh (TVM) or as an RGB+depth stream to other users in a 3D virtual environment such as a VR conference. This may require calibration of the 2 cameras in the physical space, i.e. to determine the pose of each camera relative to the other. Thereto, the client sends two RGB images to the server. The server can determine the relative position and orientation of the two cameras using a vision-based approach, i.e. performing complex stereo image point matching, see e.g. [6]. Next, the server sends the calibration data back to the client, so the client can create the 3D object data, e.g. a 3D version of the user for streaming.

In the example, the calibration data defines camera positions and orientations. For such description, an axial system may be defined, and orientation may be defined, e.g. either as pitch/roll/yaw or as a pointing vector. Either a new axial system is chosen, and the calibration data contains data for both camera poses to be matched to this new axial system. Or, one of the cameras is chosen for the axial system, e.g. saying this camera is the (0,0,0) point and its orientation is the (0,0,0) orientation, and then the calibration data contains the relative pose for the second camera.

Figure 4B:
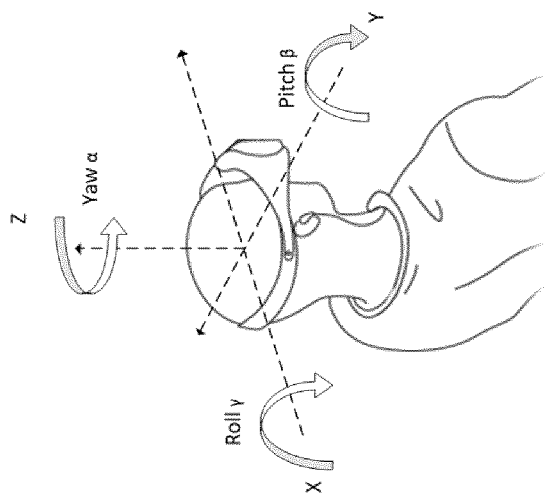
FIG. 4 shows an axial system.
Figure 4A:
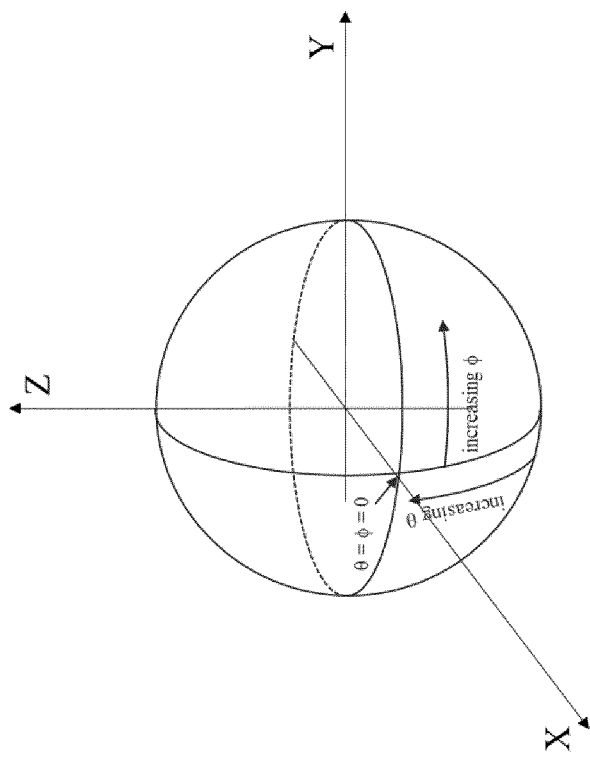

FIG. 4 shows an axial system. FIG. 4a shows an axial system without roll. FIG. 4b shows an axial system with roll. If cameras are placed level, roll need not be defined.

Using an axial system as shown in FIG. 4, a first camera position may be defined as (x,y,z)=(0,0,0) and its orientation may be defined as (yaw, pitch, roll)=(0,0,0), or as a vector with position as origin (x,y,z)=(1,0,0). The coordinates may be measured in the metric system. If a second camera is placed about 30 cm to the left at the same height, and also points at the object, the position of the second camera could be (x,y,z)=(0,0.3,0) and its orientation could be (yaw, pitch, roll)=(−30°, 0°, 0°) or in a vector (x,y,z)=(1,−0.3,0). Here, all position data may describe the lens position, i.e. the so-called pinhole. Furthermore, as metadata, camera characteristics may be used, e.g. as explained in [5].

An initial calibration may be sufficient to provide reference calibration data, e.g. when the camera positions are static. However, if cameras are moved during a session, calibration needs to be repeated, which may be called re-calibration. Re-calibration may be required if the user moves the cameras, because the user may move or the user may detect that he is not properly captured. Such camera position/orientation changes must first be detected by the system, or indicated to the system, and then new calibration data must be generated, i.e. a new relative position and orientation must be determined. Detection of the need for calibration can either be separate (i.e. detecting camera movement or zoom, etc.) or by continuously performing calibration and seeing if the results change.

In an embodiment, the processor is configured to determine a need for reference calibration data, and to include in the calibration command a request regarding said need indicating the calibration data that is needed at the client. The reference calibration data may include one or more of the following a reference view of the physical space without the object;
fixed elements in the physical space;
visual markers in the physical space;
a predefined object in the physical space.

In practice, for tracking certain objects such as an HMD, physical markers may be used to facilitate the object detection. If the exact size and shape of these markers is known, e.g. as provided by the reference calibration data, these markers may also be used in camera calibration, i.e. in the detection of the camera characteristics.

In an embodiment, the processor is configured to determine, after receiving the calibration data of an earlier calibration, a need for re-calibration, and to include, in the calibration command, a request regarding said need. For example, the request may indicate the reason for the calibration. The need may be one of detecting a movement of the camera with respect to the camera pose according to the earlier calibration;
detecting a movement of the second device;
detecting a drift in the pose updates of the second device;
addition of a further device in the physical space, the further device being able to provide further image data, depth data or data regarding the position or orientation of the further device in the physical space. For example, drift may occur in practical HMDs, specially mobile-based HMDs like Samsung gear VR or Google Daydream.

In an embodiment, or in any of the embodiments described above, the processor may be configured to, after receiving the calibration data of an earlier calibration, receive re-calibration data from the server system. Subsequently, the processor may use the re-calibration data for processing the image data to obtain the image data of the object.

In practice, camera movement may be a reason for re-calibration. The movement may be manual, but may also be changing a Pan-Tilt-Zoom (PTZ) camera, e.g. cameras that are able to track an object to be captured. In general, zooming with a camera changes the camera lens characteristics, e.g. the focal length. Panning or tilting will change the camera orientation, which may be detected or measured by tracking elements in the image. In extreme cases, the camera may be mounted on a drone or otherwise moving object, and require continuous calibration.

In an embodiment the processor is configured to obtain metadata indicative of one or parameters of the camera, or one or more parameters of the second device; and include the metadata in the calibration command. For example, the metadata may include a static device parameter. Static parameters may include a device type, a lens parameter, lens distortion data, image sensor resolution, depth sensor resolution, device data transfer format, etc. Also, the metadata may include a dynamic device parameter. Dynamic parameters may include one or more of a focal length parameter, a tilt parameter, a pan parameter, a camera focus parameter, a camera diaphragm parameter, synchronization data.

To correctly place a self-view, a calibration is needed between a user pose, e.g. wearing an HMD, and the camera pose. The camera may be an RGB+depth camera, which output is sufficient to create a 3D image of a user. This camera captures the user, presumably from the front, i.e. the user is sitting straight in front of the camera. By using the camera characteristics, i.e. focal length, the user can be measured correctly based on the depth values.

Placement of the 3D model of the user in a virtual environment requires coordinates and orientation. The user sees the virtual environment though a virtual camera (or cameras, one for each eye). As the user moves his head, i.e. by rotating or moving it in space, this movement is tracked by the HMD system, e.g. using HMD-internal sensors or outside tracking sensors or a combination thereof. The virtual camera pose is updated according to the tracking data, thereby ensuring a correct visual response of the virtual environment to the user's head movement.

When the self-view is created, it needs to be placed correctly in the virtual environment, both in position and orientation and in size. Thus, the camera output needs to be linked to the axial system of the HMD, i.e. calibration is required. As the user, including his HMD, is in view of the camera, this can be used for calibration purposes. But, only detecting the HMD in the image (RGB and depth image) alone is not sufficient. The pose in the image needs to be linked to the HMD pose at the moment of capture of the image. Once the axial systems of both camera and HMD are calibrated, any images captured by the camera can be correctly placed in the virtual environment.

Figures 5A, 5B:
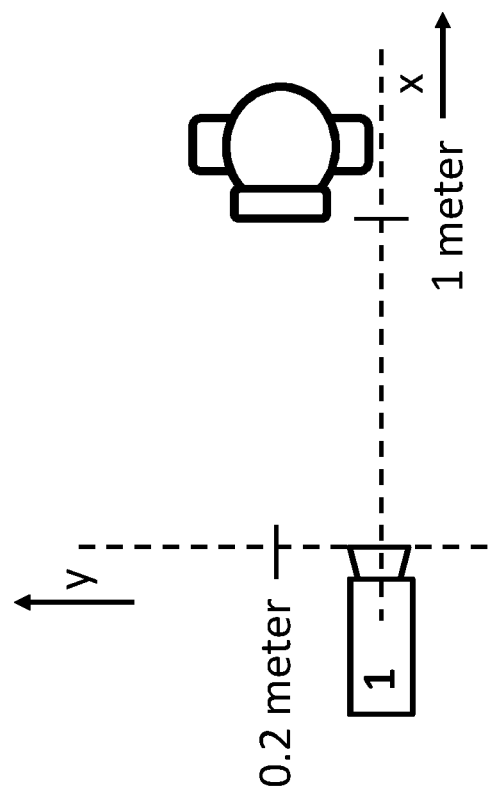
FIG. 5a shows a camera pointing at a user.
FIG. 5b shows a capture of the camera of the scene shown in FIG. 5a, FIGS. 5c and 5d schematically show a calibration of the camera and an HMD.

FIG. 5a shows a camera pointing at a user. The camera may be an RGB+Depth camera. The user is located a bit to the left of the camera, and is looking straight forward, while wearing an HMD.

FIG. 5b shows a capture of the camera of the scene shown in FIG. 5a. The camera also provides a depth image, which represents the distance between lens and captured object. In this case, the front of the HMD is 1 meter in front of the camera, and the HMD is at the same height as the camera.

Figure 5C:
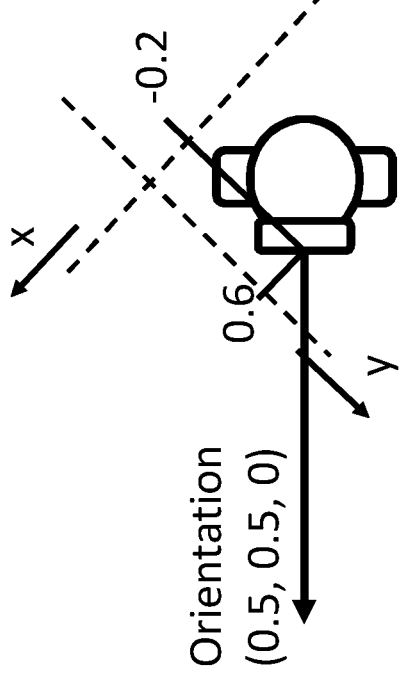
Figure 5D:
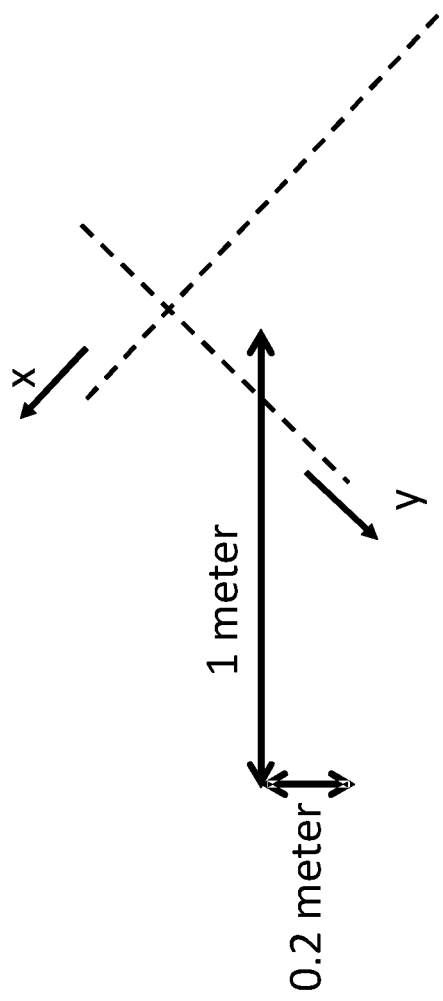

FIGS. 5c and 5d schematically show a calibration of the camera and an HMD. The axial system shown in FIG. 4a is used to be the camera axial system. The camera lens center, which follows a pin-hole model, is at the origin of the system, i.e. the (0,0,0) point, and the X-axis is the north axis, i.e. the X-axis is where the camera is pointing. Also, it is assumed that the camera is placed level.

The detected HMD would be then at e.g. the (1, 0.2, 0), and its orientation would be (described as a vector from the object origin) (−1, 0, 0), described in the axial system of the camera. Here assume that the center point of the HMD is indicated for this. Thus, a calibration command may include:

The RGB image and the linked depth image.
The focal length of the camera.
The current HMD pose (i.e. at the moment of capturing the RGB+D image), and the axial system used for this (see below).

A default calibration request could mean: describe the camera in terms of the HMD axial system. For example, assume the HMD internally uses the same axial system shown in FIG. 4. Next, say the HMD pose at the moment of capturing the RGB+depth image consisted of position (−0.2, 0.6, 0) and orientation described as a vector (0.5, 0.5, 0). For purposes of position, the center of the HMD is considered, and the line straight forward as orientation.

The result of the calibration may be the pose of the camera described in this axial system. The position is:

x-axis (in cm): $-20+\text{sqrt}(100^2/2)-\text{sqrt}(20^2/2)=37$ (rounded)
y-axis (in cm): $60+\text{sqrt}(100^2/2)+\text{sqrt}(20^2/2)=145$ (rounded)

So, the position of the camera is (0.37, 1.45, 0). The orientation of the camera is directly opposite the viewing direction of the user, and is thus (−0.5, −0.5, 0). This is described in the HMD axial system. The result of the calibration will thus be this pose. This will allow the client system to process the camera image and place the self-view in the virtual environment at the position of the user. Even if the user moves afterwards, this is not an issue, as the HMD tracker is continuously monitoring the pose of the HMD.

Exact placement of the self-view is an additional step. The RGB+depth image has to be transformed in a 3D image, e.g. using a point cloud representation: every pixel becomes a pixel with a placement value in 3 dimensions. This may be a color image containing depth. The image may be rendered on a plane in the virtual environment, where of course pixels will be placed in front or behind this plane, based on the depth values. Please note that these points might also be bended behind or in front of the plane based on the focal length of the camera and the specific camera image mapping technique used. But, the plane has to be placed at exactly the correct position in the virtual environment, to ensure proper alignment of the self-view. Normally, a plane is placed by indicating its four corners or by indicating two opposite corners.

FIG. 6a shows a user self-view to be positioned and a plane A-B. In the figure, the view from above is shown, whereby the depth of the image of the user is entirely behind the plane, i.e. the front of the HMD has depth value of 0 and the back of the head has e.g. a depth value of 0.2 meters. The left side of the frame is A and the right side is B, as seen from the front.

FIG. 6b shows the front view of the self-image, showing the entire plane. Here it is shown that A is the top left corner of the frame, and thus the left side as seen from above in FIG. 6a, and that B is the bottom right corner of the frame, and thus the right side as seen from above in FIG. 6a. To correctly place this self-view, the proper coordinates for corners A and B need to be determined, thereby both correctly placing the self-view and correctly sizing it.

The frame size at the distance of 1 meter, as can be determined from the focal length, is assumed to be 1 meter high and 1.6 meter width, as shown in FIG. 6b.

FIG. 6c shows determining the corner coordinates for A and B. In the Figure, the coordinates are determined as:

For corner A
  the x-axis (in cm): −20+sqrt (40^2/2)=8.3 cm
  the y-axis (in cm): 60+sqrt (40^2/2)=31.7 cm
For corner B
  the x-axis (in cm): −20−sqrt (120^2/2)=−104.9 cm
  the y-axis (in cm): 60+sqrt (120^2/2)=144.9 cm The height of the center of the HMD was assumed to be at the z=0 level. Thus, the coordinates of corner A will be (0.083, 0.317, 0.5) and that of corner B will be (−104.9, 144.9, −0.5). By placing the video plane at this location, the self-view will be correctly placed and sized. Note that this needs to be corrected for the eye placement in relation to the HMD front, i.e. for the left eye placed backward about 5 cm and leftward about 3.5 cm and for the right eye placed backward about 5 cm and rightward about 3.5 cm, assuming inter-ocular distance of 7 cm.

Other ways of projecting the self-view in the 3D virtual environment are also possible. For example, a projection of all the points of the point cloud from a single point is also possible, which is kind of reversing the capture process. The position and orientation of the projection point, which maps to the pinhole point of the camera, must be determined, based on aligning the HMD. Next, the RGB+depth information is projected outward from this point, using the focal length of the camera with which the recording is made. Other ways of projecting this may also be possible, e.g. indicating the location of a single point from the point cloud, e.g. the center of the HMD, and calculate relative positions for all the other points and place them directly as points in the 3D scene.

There are various ways this calibration information can be exchanged. One of these ways can be a default way, and any calibration request is a request to apply this default to the calibration. Alternatively, the calibration command may contain an instruction on how the calibration should be described. Alternatives are:

Describe the camera output in terms of the axial system of the HMD;
Describe the HMD in terms of the camera axial system, i.e. the axial system described from the viewpoint of the camera;
Choose some reference axial system, and describe both camera output and HMD in terms of this reference system.

Also, the reference system may be based on a static part in the captured images, e.g. on a table or a wall. Note that if one of the devices cannot see outward, such as an HMD, it cannot conform to an outside reference point on its own: in such a case, the camera image needs to be usable for both adhering to the outside reference system and for calibration of the other device.

Also, the axial system to be used, may be defined in advance, or may be agreed upon in a preliminary communication. Typically, X-axis is horizontal, Y-axis is also horizontal but orthogonal to X-axis, and Z-axis is vertical. But other systems use Y-axis as vertical and Z-axis as second horizontal axis. Besides this, the rotation on each of the axis can either be right-handed (i.e. right thumb in direction of the axis and fingers showing the positive orientation direction) or left-handed (i.e. left thumb in direction and fingers showing the orientation). FIG. 4b shows a right-handed system. Orientation can be either indicated in yaw-pitch-roll using this orientation system, or as a vector defined as pointing from the origin. Any calibration needs to choose a system, e.g. either defining one as a default, or indicating the system used or required to be used.

Calibration between two cameras or between a separate RGB camera or stereo camera and a depth camera can be achieved similarly. Note that the above examples assume a perfect camera, i.e. there are no deformations present in the image. As cameras are per definition not perfect, i.e. the lens may cause distortion (e.g. barrel distortion, pincushion distortion) and the placement of the lens and the sensor may not be perfectly aligned. To get correct geometric information, the output of the camera needs to be adjusted for this. If a camera is calibrated with a known geometric shape (e.g. a chessboard), this allows to create a filter that can be applied to the raw camera output to adjust for this, and gain correct geometric information. Such information may be sent to the server as part of the calibration request. Or, this filter may already be applied at the capture side before encoding and transmission, and thus no further correction is needed.

Another part that may need to be part of the calibration request is a principle point offset. Certain cameras may have the sensor not directly behind the lens, i.e. the principle point may not be the center point of the image. If this is the case, this principle point offset needs to be part of the calibration request.

FIG. 7a shows a method 500 for a processor system. The method is for processing image data from a camera in a physical space to render a virtual object in a 3D virtual environment. The virtual object represents an object in the physical space, e.g. the head of a human. The processor system, also called client, is arranged to communicate via a network to a server system, also called server, as schematically indicated by the arrow 560 representing signal data to be transferred between the client and the server as described above. The signal data is structured to carry the calibration command or the calibration data. The processor system has a network interface for exchanging data via the network, a capture interface to the camera, and a second device interface to a second device in the physical space. The camera has a camera pose in the physical space and the second device has a second pose in the physical space, the second pose being different from the camera pose.

The method may start with a capture process 510 to obtain image data of the physical space from the camera via the capture interface. Also, e.g. in parallel, the method performs a second process 520 to obtain second data of the second device via the second device interface, e.g. an HMD, a second camera or a depth camera. Subsequently, in a transfer process 540 the method sends the image data, the second data and a calibration command to the server in one or more transfer steps. Then, in response, the method receives, in a further communication process 550, calibration data according to the calibration command from the server. The calibration data is indicative of the camera pose and the second pose. The communication process with the server is schematically shown by dashed box 530 and the signals 560 to be transferred via the network. Finally, in a generation process 570, the method generates 3D object data of the object by processing the image data based on the calibration data. The 3D object data is provided, for example to a head mounted display, for rendering the virtual object in the 3D virtual environment.

FIG. 7b shows a server method 600 for a server system. The server method is for processing image data from a camera in a physical space for rendering a virtual object in a 3D virtual environment. The server system is arranged to communicate via a network to a processor system, as schematically indicated by the arrow 560 representing signal data to be transferred between the processor system and the server system as described above.

The server method starts with a first communication process 640 to receive image data of the physical space obtained by the camera, second data of a second device in the physical space and a calibration command from the processor system via the network interface. Then, the server method proceeds by a processing resource step 610 to process the image data and the second data according to the calibration command to generate calibration data indicative of the camera pose and the second pose. Next, in a second communication process 650, the method sends the calibration data to the processor system via the network interface. The communication process with the client is schematically shown by dashed box 630 and the signals 560 to be transferred via the network.

In an embodiment of the server system, the processing resource is configured to determine, after an earlier calibration, a need for re-calibration. Such need may be determined based on receiving a re-calibration command indicating the need for re-calibration. Also, the need may be determined by the server based on image data and/or data of the second device, for example by detecting a movement of the camera with respect to the camera pose according to the earlier calibration, or detecting a movement of the second device with respect to the second pose according to the earlier calibration. Also, the server may detect the addition of a further device in the physical space, the further device being able to provide further data regarding the physical space. For example, a further person having an active mobile phone may enter the physical space and provide image data.

Subsequently, the processing resource is configured to process the image data and the second data to generate re-calibration data indicative of the camera pose and the second pose; and send the re-calibration data to the processor system.

In an embodiment of the server system, the processing resource may be configured to monitor data as provided by the client upon receiving a monitoring command. Subsequently, the processing resource is configured to monitor a data stream regarding the physical space from the camera or the second device. Upon receiving such data stream, the processing resource determines a need for re-calibration based on the data stream and the calibration data, and engages a re-calibration to generate re-calibration data for sending the re-calibration data to the processor system.

In an embodiment of the server system, the image data comprises a first image at a first instant and a second image at a second instant, and the second data is indicative of an actual movement of the second device from the second pose at the first instant to a subsequent second pose at the second instant. The processing resource is configured to detect the actual movement of the second device as represented in the image data. Subsequently, the processing resource derives at least one camera parameter from the actual movement as represented; and uses the camera parameter as derived for generating the calibration data.

Also, in the server system the processing resource may be configured to determine reference calibration data, and to send the reference calibration data to the processor system. The reference calibration data may include one or more of the following a reference view of the physical space without the object;
fixed elements in the physical space;
visual markers in the physical space;
a predefined object in the physical space.

Performing the processing on a server may cause some delay, due to first sending image data to the server, and then receiving calibration data from the server. This is acceptable, as server processing may be done more quickly. Also, in many cases zero-delay is not required. If a camera is moved, a user may well accept that it takes a little time before the 3D environment is 'stable' again.

In the above described configuration of client and server, the server system could be at any location. Also, the server system may be one server but may also be distributed or functionality may be partitioned over multiple servers. For example, any location in the internet may be called in the 'cloud', or it may be a regular server connected to the internet. However, a server may also be engaged strategically, e.g. at a special location near the client, i.e. the capture point, which may be called at the network 'edge' or 'edge computing'. Having the processing near the capture point is more efficient for the network, because image data need not be transferred through the network, which may also minimize delays. Also, streams may be sent to other users, and these streams may go via the server, or may be forked to the server, for said calibration. Such routing brings additional efficiency, as the client needs to send image data only once for both purposes. The network 100 is only schematically shown, but may have a multitude of network resources like nodes coupled via links, and may have at least one network controller arranged to execute the above routing or forking.

In practice, the processor system 200 for rendering a virtual object in a virtual environment may be, but does not need to be, integrated in a single device, for example a smartphone also being the camera, a smartphone in a VR enclosure, personal computer, laptop, tablet device, set-top box, smart watch, smart glasses, television, monitor, projector, media player, media recorder, audio system, gaming console, etc. Alternatively, the system 200 may be distributed over multiple devices or subsystems, such as two or more smartphones that are locally connected, e.g. via Wi-Fi, or via a network like 4G or 5G. The system 200 is shown to be connected to a camera 20 from which image data 22 may be received of a physical space. Alternatively, the system 200 may comprise the camera 20. Alternatively, the system 200 may be integrated into the camera 20.

The server system 300 may receive the image data obtained from the camera 20. The server 300 may then further transmit the image data 22 to other devices participating in the virtual environment. In addition to providing the image data 22 to the server, the system 200 may further provide 3D the object data to the server 300 to enable the server and/or other rendering devices to render the 3D virtual object, e.g. a virtual representation of the user in the virtual environment. For that purpose, different types of 3D object data may be provided by the client depending on which type of second device is engaged and/or which type of object is to be rendered.

Optionally, the processor system 200 and/or the server system 300 may be arranged to communicate with a database. The database may comprise metadata of one or more different camera types or other second devices, which may be stored and retrieved based on their type identifiers. Accordingly, the system 200 may obtain the camera metadata, or additional device metadata such as e.g. physical size and shape, by obtaining a type identifier of the camera or second device, and look up the type identifier in the database. It will be appreciated that the database may be an internal database, but may also be an external database, e.g., a network-hosted database. Alternatively to using a database, the metadata may also be queried from another entity or service, such as a search engine or an 'artificial intelligence'-based assistant service. For that purpose, use may be made of appropriate APIs.

Furthermore, the processor system 200 and the server system 300 are usually located at different locations, such as different rooms, buildings or places. As such, the communication between the devices may be telecommunication, e.g., involving data communication via a network such as, or including, one or more access networks and/or the Internet.

Furthermore, the processor system 200 may have, in additional to network and camera interfaces described above, a memory comprising instruction data representing a set of instructions, while the processor 220 is configured to communicate with the memory and to execute the set of instructions, wherein the set of instructions, when executed by the processor, cause the processor 220 to perform the various functions as described above.

The network interface 240 may take any suitable form, including but not limited to a wireless network interface, e.g., based on Wi-Fi, Bluetooth, ZigBee, 4G mobile communication or 5G mobile communication, or a wired network interface based on Ethernet or optical fiber. The network interface 240 may be to a local area network (LAN) network interface but also a network interface to a wide area network (WAN), e.g., the Internet.

The server system 300 to which the camera metadata is provided may be a server configured to host the virtual environment or a rendering device configured to render the virtual environment. This may be similar to current setups for video conferencing, where either a video-multipoint-control-unit is used to mix the videos of all participants in a particular way (i.e. server-based), or peer-to-peer communication is used between all users and where each user's device renders all input locally (e.g., rendering-device based). The network entity 300 may further comprise a memory comprising instruction data representing a set of instructions. The server has a processing resource 320 configured to communicate with the network interface 310 and the memory, and to execute the set of instructions, wherein the set of instructions, when executed by the processor 320, may cause the processor 320 to generate the calibration data as described above.

In general, the processing system 200 of and the server system 300 may each be embodied as, or in, a device or apparatus. The device or apparatus may comprise one or more (micro)processors which execute appropriate software. The processors of the system and the communication device may be embodied by one or more of these (micro) processors. Software implementing the functionality of the system or the network entity may have been downloaded and/or stored in a corresponding memory or memories, e.g., in volatile memory such as RAM or in non-volatile memory such as Flash. Alternatively, the processors of the system or the network entity may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of the system or the network entity may be implemented in the form of a circuit. It is noted that the processor system or the server may also be implemented in a distributed manner, e.g., involving different devices or apparatuses.

In general, the rendered 3D virtual environment may be displayed using a display. The display may be of a head mounted VR device or in short VR headset, e.g., of a same or similar type as the 'Oculus Rift', 'HTC Vive' or 'PlayStation VR'. Other examples of VR devices are so-termed Augmented Reality (AR) devices, such as the Microsoft HoloLens or the Google Glass goggles, or mobile VR devices such as the Samsung Gear VR or Google Cardboard. It will be appreciated that the display may not need to be head mountable, but rather, e.g., a separate holographic display or a CAVE like system.

Figure 8:
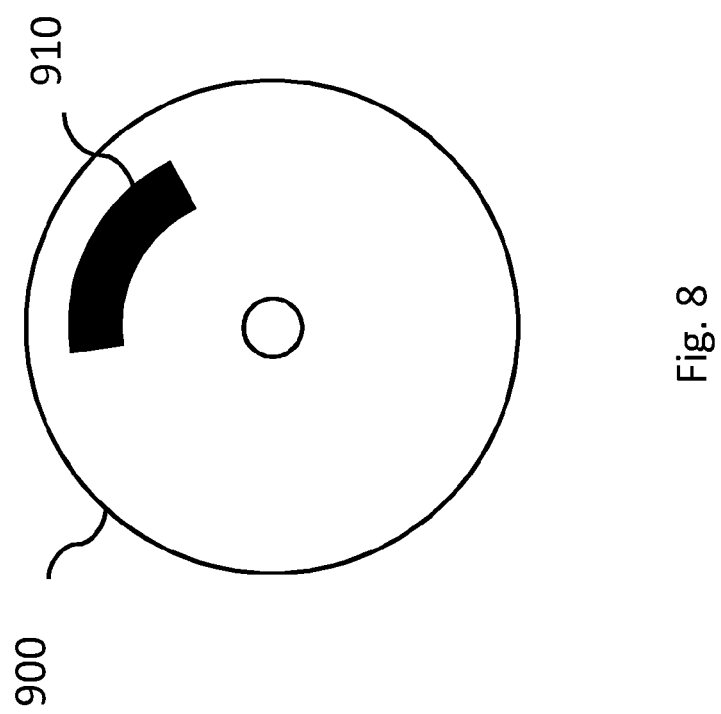
FIG. 8 shows a transitory or non-transitory computer-readable medium.

FIG. 8 shows a transitory or non-transitory computer readable medium, e.g. an optical disc 900. Instructions for the computer, e.g., executable code, for implementing one or more of the methods as illustrated with reference to FIGS. 5a and 5b, may be stored on the computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

Figure 9:
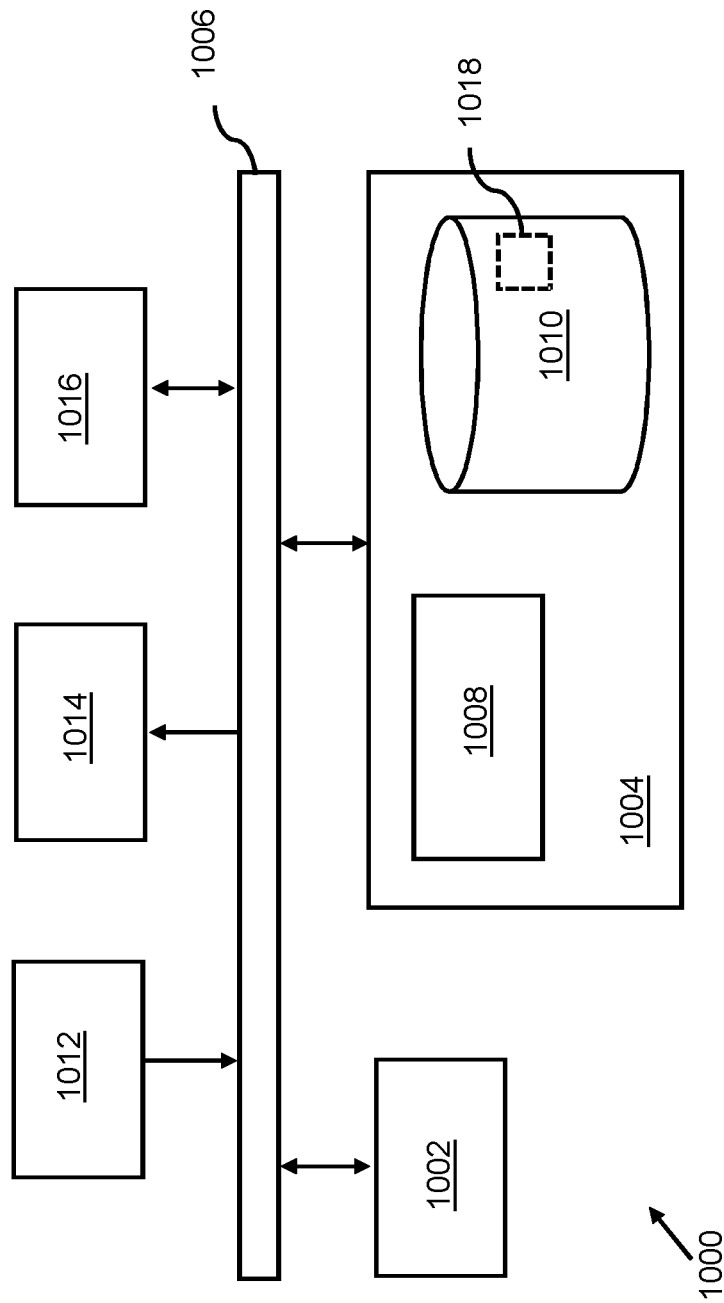
FIG. 9 shows an exemplary data processing system.

FIG. 9 shows a block diagram illustrating an exemplary data processing system that may be used in the embodiments of the processor system or server system as described above. Such data processing systems include data processing entities described in this disclosure, including, but not limited to, the processor system for generating the 3D object data or the server system for generating the calibration data. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It will be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 may optionally be coupled to the data processing system. Examples of input devices may include, but are not limited to, for example, a microphone, a keyboard, a pointing device such as a mouse, a touchscreen or the like. Examples of output devices may include, but are not limited to, for example, a monitor or display, speakers, or the like. Input device and/or output device may be coupled to data processing system either directly or through intervening I/O controllers. A network interface 1016 may also be coupled to, or be part of, the data processing system to enable it to become coupled to other systems, computer systems, remote network devices, and/or remote storage devices through intervening private or public networks. The network interface may comprise a data receiver for receiving data that is transmitted by said systems, devices and/or networks to said data and a data transmitter for transmitting data to said systems, devices and/or networks. Modems, cable modems, and Ethernet cards are examples of different types of network interface that may be used with data processing system 1000.

As shown in FIG. 7, memory elements 1004 may store an application 1018. It should be appreciated that the data processing system 1000 may further execute an operating system (not shown) that may facilitate execution of the application. The application, being implemented in the form of executable program code, may be executed by data processing system 1000, e.g., by the processor 1002. Responsive to executing the application, the data processing system may be configured to perform one or more operations as described above in further detail.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

REFERENCES

[1] Alexiadis, D. S., Zarpalas, D., & Daras, P. (2013). Real-time, full 3-D reconstruction of moving foreground objects from multiple consumer depth cameras. *IEEE Transactions on Multimedia,* 15(2), 339-358.

[2] Mielczarek, A., Makowski, D., Perek, P., Napieralski, A., & Sztoch, P. (2016, June). FPGA-based image analyzer for calibration of stereo vision rigs. In Real Time Conference (RT), 2016 *IEEE-NPSS* (pp. 1-2). IEEE.

[3] Doubek, P., Svoboda, T., & Van Gool, L. (2003, April). Monkeys-a software architecture for ViRoom-low-cost multicamera system. In *International Conference on Computer Vision Systems* (pp. 386-395). Springer, Berlin, Heidelberg.

[4] MPEG, Use cases and requirements for NBMP (v4), April 2018. https://mpeg.chiariglione.org/standards/mpeg-i/network-based-media-processing/use-cases-and-requirements-nbmp-v4

[5] Remondino, F., & Fraser, C. (2006). Digital camera calibration methods: considerations and comparisons. International Archives of Photogrammetry, *Remote Sensing and Spatial Information Sciences,* 36(5), 266-272.

[6] Remondino, F., Spera, M. G., Nocerino, E., Menna, F., & Nex, F. (2014). State of the art in high density image matching. *The Photogrammetric Record,* 29(146), 144-166.

The invention claimed is:

1. A processor system for processing image data from a camera in a physical space to render a virtual object in a 3D virtual environment,
   the virtual object representing an object in the physical space,
   the processor system arranged to communicate via a network to a server system comprising a processing resource, wherein the processor system comprises
   a network interface for exchanging data via the network;
   a capture interface to the camera;
   a second device interface to a second device in the physical space, wherein
   the second device comprises at least one of
   a head mounted display;
   a user interaction device for sensing a movement of a user in the physical space;
   the camera having a camera pose in the physical space and the second device having a second pose in the physical space, the second pose being different from the camera pose; and
   a processor configured to:
      obtain image data of the physical space from the camera via the capture interface;
      obtain second data of the second device via the second device interface, wherein the second data is data regarding the position or orientation of the second device in the physical space comprising at least one of
      a displacement distance of the second device;
      a displacement direction of the second device;
      a rotation angle of the second device;
      a rotation direction of the second device;
      send the image data, the second data and a calibration command to the server system;
      receive calibration data according to the calibration command from the server system, the calibration data being indicative of the camera pose and the second pose;
      generate 3D object data of the object by processing the image data based on the calibration data, the 3D object data being provided for rendering the virtual object in the 3D virtual environment.

2. The processor system as claimed in claim 1, wherein the second device comprises a head mounted display and the object comprises at least part of a person wearing the head mounted display in the physical space, and the processor is configured to generate, as the 3D object data, position and/or orientation data of the person by processing the image data to determine the pose of the head mounted display, the 3D object data being provided for rendering a self-view as the virtual object in the 3D virtual environment.

3. The processor system as claimed in claim 1, wherein the second device comprises at least one of
   a second camera;
   a depth camera;
   and the processor is configured to
   obtain, as the second data, at least one of
   second image data of the physical space;
   depth data of the physical space.

4. The processor system as claimed in claim 1, wherein the processor is configured to
   obtain metadata indicative of at least one parameter of the camera or the second device; and
   include the metadata in the calibration command.

5. The processor system as claimed in claim 4, wherein the metadata comprises a static device parameter comprising at least one of device type, a lens parameter, lens distortion data, image sensor resolution, depth sensor resolution, device data transfer format; or
   the metadata comprises a dynamic device parameter comprising at least one of a focal length parameter, a tilt parameter, a pan parameter, a camera focus parameter, a camera diaphragm parameter, synchronization data.

6. The processor system as claimed in claim 1, wherein the processor is configured to determine a need for reference calibration data, the reference calibration data comprising at least one of
a reference view of the physical space without the object;
fixed elements in the physical space;
visual markers in the physical space;
a predefined object in the physical space;
and the processor is configured to
include in the calibration command a request regarding said need for reference calibration data.

7. The processor system as claimed in claim 1, wherein the processor is configured to determine, after receiving the calibration data of an earlier calibration, a need for re-calibration comprising one of
detecting a movement of the camera with respect to the camera pose according to the earlier calibration;
detecting a movement of the second device;
addition of a further device in the physical space, the further device being able to provide further image data, depth data or data regarding the position or orientation of the further device in the physical space;
and the processor is configured to
include, in the calibration command, a request regarding said need for re-calibration.

8. The processor system as claimed in claim 1, wherein the processor is configured to, after receiving the calibration data of an earlier calibration,
receive re-calibration data from the server system; and
use the re-calibration data for processing the image data to obtain the image data of the object.

9. A server system for processing image data from a camera in a physical space for rendering a virtual object in a 3D virtual environment, the virtual object representing an object in the physical space,
the camera having a camera pose in the physical space and a second device in the physical space, the second device having a second pose in the physical space, the second pose being different from the camera pose, wherein the second device comprises at least one of
a head mounted display;
a user interaction device for sensing a movement of a user in the physical space;
the server system arranged to communicate via a network to a processor system,
wherein the server system comprises
a network interface for exchanging data via the network and
a processing resource configured to:
receive image data of the physical space obtained by the camera, second data of the second device in the physical space and a calibration command from the processor system via the network interface, wherein the second data is data regarding the position or orientation of the second device in the physical space comprising at least one of
a displacement distance of the second device;
a displacement direction of the second device;
a rotation angle of the second device;
a rotation direction of the second device;
process the image data and the second data according to the calibration command to generate calibration data indicative of the camera pose and the second pose; and
send the calibration data to the processor system via the network interface.

10. The server system as claimed in claim 9, wherein the processing resource is configured to determine, after an earlier calibration, a need for re-calibration comprising one of
receiving a re-calibration command indicating the need for re-calibration;
detecting a movement of the camera with respect to the camera pose according to the earlier calibration;
detecting a movement of the second device with respect to the second pose according to the earlier calibration;
addition of a further device in the physical space, the further device being able to provide further data regarding the physical space;
and the processing resource is configured to
process the image data and the second data to generate re-calibration data indicative of the camera pose and the second pose; and
send the re-calibration data to the processor system.

11. The server system as claimed in claim 9, wherein the processing resource is configured, upon receiving a monitoring command, to
monitor a data stream regarding the physical space from the camera or the second device;
determine a need for re-calibration based on the data stream and the calibration data;
engage a re-calibration to generate re-calibration data for sending the re-calibration data to the processor system.

12. The server system as claimed in claim 9, wherein
the image data comprises a first image at a first instant and a second image at a second instant, and the second data is indicative of an actual movement of the second device from the second pose at the first instant to a subsequent second pose at the second instant, and the processing resource is configured to
detect the actual movement of the second device as represented in the image data;
derive at least one camera parameter from the actual movement as represented; and
use the camera parameter as derived for generating the calibration data.

13. The server system as claimed in claim 9, wherein processing resource is configured
to determine reference calibration data, the reference calibration data comprising at least one of
a reference view of the physical space without the object;
fixed elements in the physical space;
visual markers in the physical space;
a predefined object in the physical space,
and to send the reference calibration data to the processor system.

14. A processing method for a processor system for processing image data from a camera in a physical space to render a virtual object in a 3D virtual environment, the virtual object representing an object in the physical space,
the processor system arranged to communicate via a network to a server system, the camera having a camera pose in the physical space and a second device having a second pose in the physical space, the second pose being different from the camera pose, wherein the second device comprises at least one of
a head mounted display;
a user interaction device for sensing a movement of a user in the physical space;
wherein the method comprises:
obtaining image data of the physical space from the camera;
obtaining second data of the second device, wherein the second data is data regarding the position or orientation of the second device in the physical space comprising at least one of a displacement distance of the second device;
a displacement direction of the second device;
a rotation angle of the second device;
a rotation direction of the second device;
sending the image data, the second data and a calibration command to the server system;
receiving calibration data according to the calibration command from the server system, the calibration data being indicative of the camera pose and the second pose; and
generating 3D object data of the object by processing the image data based on the calibration data, the 3D object data being provided for rendering the virtual object in the 3D virtual environment.

15. A non-transitory computer-readable medium comprising a computer program, the computer program comprising instructions for causing a processor to perform the method according to claim 14.

16. A processing method for a server system for processing image data from a camera in a physical space for rendering a virtual object in a 3D virtual environment, the virtual object representing an object in the physical space, the server system arranged to communicate via a network to a processor system, wherein the method comprises:
receiving image data of the physical space obtained by the camera, second data of a second device in the physical space and a calibration command from the processor system, wherein the second device comprises at least one of
a head mounted display;
a user interaction device for sensing a movement of a user in the physical space;
and wherein the second data is data regarding the position or orientation of the second device in the physical space comprising at least one of
a displacement distance of the second device;
a displacement direction of the second device;
a rotation angle of the second device;
a rotation direction of the second device;
processing the image data and the second data according to the calibration command to generate calibration data indicative of the camera pose and the second pose; and
sending the calibration data to the processor system.

* * * * *